Figure 1:
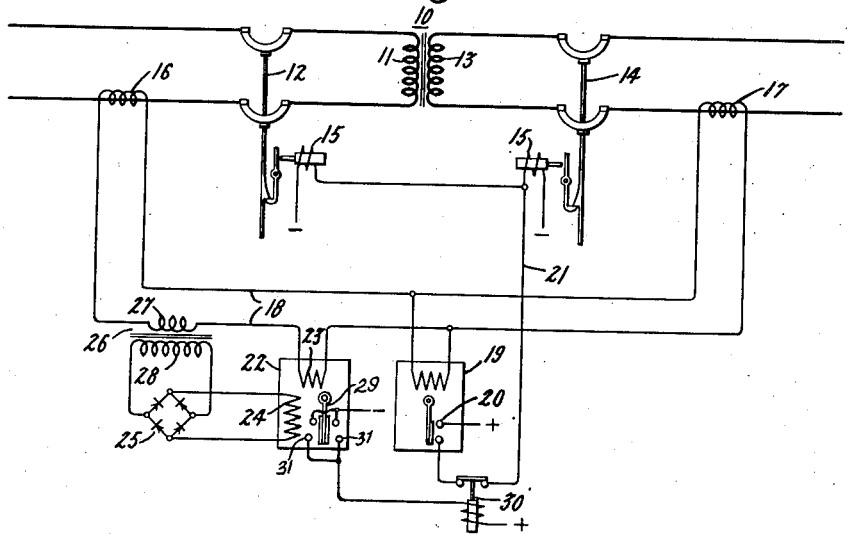

July 14, 1942.                H. GUTMANN                2,290,101
                        PROTECTIVE ARRANGEMENT
                          Filed Oct. 11, 1940

Inventor:
Heinz Gutmann,
by Harry E. Dunham
His Attorney.

Patented July 14, 1942

2,290,101

UNITED STATES PATENT OFFICE 2,290,101

PROTECTIVE ARRANGEMENT

Heinz Gutmann, Berlin, Germany, assignor to General Electric Company, a corporation of New York Application October 11, 1940, Serial No. 360,829
In Germany December 19, 1939

10 Claims. (Cl. 175—294)

My invention relates to improvements in protective arrangements and more particularly to improvements in protective arrangements for alternating-current electric apparatus subject to transient in-rush currents.

Electric apparatus is often protected against short circuits by means of a differential protective system, the principle of which is well known. It comprises, at the input and output ends of the apparatus, current transformers whose transformation ratios are such that equal currents are produced in the secondary windings thereof. These secondary windings are then connected in series so that, under normal conditions, the potential across this series circuit is substantially zero and a differential relay connected thereacross will not be operative under normal conditions since it is responsive to a current proportional to the difference between the currents entering and leaving the apparatus being protected. When the apparatus thus protected has an internal fault, a current flows through the relay causing it to operate and resulting in the tripping of circuit breakers which are disposed so as to isolate the protected apparatus from the rest of the system.

With no internal fault on the protected apparatus, the differential relay current, as was mentioned above, should theoretically be zero. However, as will be understood by those skilled in the art, the use of ordinary current transformers is likely to introduce errors so that a differential current may flow through the relay even though no fault exists on the protected system or apparatus. Furthermore, if the protected area includes a transformer or other apparatus in which there is a flow of magnetizing current, this will also cause a differential current to flow in the relay. Accordingly, it is necessary to adjust the relay with a sufficiently low sensitivity to make sure that it does not operate under the action of the differential current resulting from the flow of magnetizing current or the differential current resulting because of errors in the current transformers. Since current transformers may be chosen and coordinated so that the errors thereof are relatively small and, furthermore, since under normal operating conditions the magnetizing current is only a small fraction of the normal current flowing in the system, such decrease in sensitivity of the differential relay may be so slight as not to be detrimental to the operation of the protective arrangement.

On the other hand, when the apparatus being protected is subject to transient in-rush currents, such, for example, as the transient magnetizing currents which flow when a power transformer, for example, is connected to its source of energy, these in-rush currents are liable to attain very high values and the differential current resulting may cause tripping of the differential relay even though no fault exists in the protected area. My invention is particularly concerned with preventing such false tripping of differential relays due to in-rush currents, such as the transient magnetizing currents of differentially protected power transformers.

Numerous schemes have been suggested for preventing such false tripping of differential protective systems. Among these are providing the differential relay with a time delay to prevent its operation until after the in-rush current has subsided. However, the transient magnetizing currents of differentially protected transformers have a very slow decrement which requires some time to disappear, for example, several seconds in the case of large apparatus. Such a time delay preventing the operation of the differential relay obviously removes the protection of the protective arrangement during this initial period and, therefore, is not very satisfactory since it delays the isolation of the system in case of a fault, thereby increasing the destructive effects to which the protected apparatus is subjected.

It has also been suggested to decrease the sensitivity of the differential relay either permanently or temporarily upon the occurrence of such transient currents which are likely to cause false tripping. In prior arrangements, such temporary decreases in sensitivity has been obtained either manually or automatically. Although temporarily decreasing the sensitivity of the differential relay is far superior to permanently decreasing such sensitivity, nevertheless, difficulties often occur through the more or less indefinite timing of the period of decreased sensitivity and, furthermore, where the sensitivity is decreased manually, such protective arrangement, of course, is subject to the fallibility of the human element.

In accordance with my invention, the sensitivity of the protective arrangement is always maintained at a high value and means are provided which distinguish the transient in-rush or magnetizing currents from fault currents existing in the protected area. Since transient magnetizing or in-rush currents, as is well known by those skilled in the art, are characterized by a strong second harmonic, I provide means operative in response to the existence of such second harmonic currents for preventing the differential relay from isolating the protective apparatus unless an actual fault exists in the protected area. Specifically, my invention is an improvement on United States Letters Patent 1,787,277, granted December 30, 1930, upon an application of Luke F. Kennedy, and assigned to the assignee of the present application.

One object of my invention is to provide an improved protective arrangement in which false operation of the protective apparatus due to transient in-rush or magnetizing currents is eliminated and yet wherein a high degree of sensitivity of the protective system is maintained at all times.

Another object of my invention is to provide new and improved means for preventing the operation of a differential protective system for a power transformer upon the occurrence of transient magnetizing currents without resorting to complicated filter circuits and the like.

Further objects and advantages of my invention will become apparent as the following description proceeds and the features of novelty which characterize my invention will be pointed out with particularity in the claims annexed to and forming a part of this specification.

Figure 2:
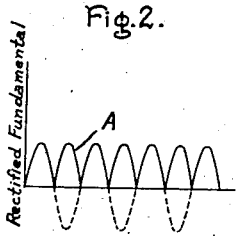
Figure 3:
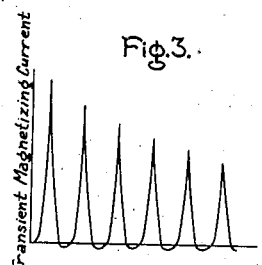
Figure 4:
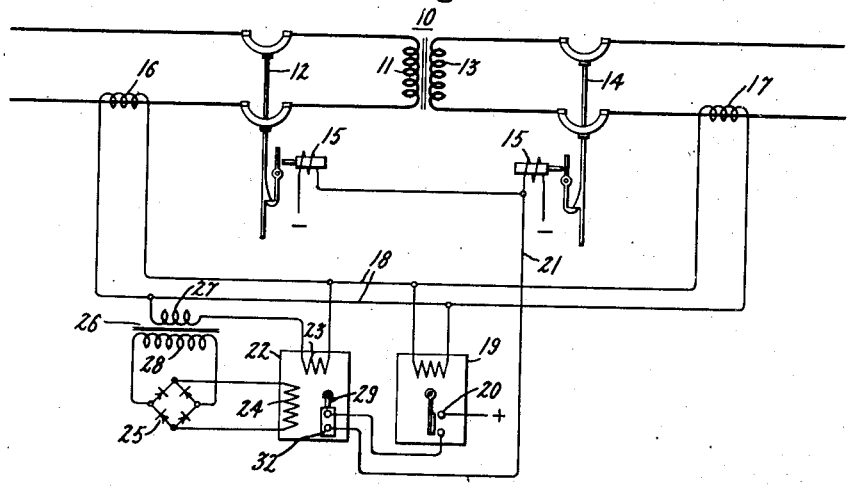

For a better understanding of my invention, reference may be had to the accompanying drawing in which Fig. 1 is a schematic diagram of a protective arrangement embodying my invention, Figs. 2 and 3 represent certain wave forms showing electrical characteristics of the protective arrangement of Fig. 1 in order to aid in understanding the operation thereof, and Fig. 4 is a schematic diagram of a modification of the protective arrangement of Fig. 1.

Although my invention is applicable to protective systems for any electrical circuit or apparatus wherein transient in-rush currents are likely to flow when connected to the power supply, I have illustrated my invention specifically in connection with a differential protective arrangement for a power transformer wherein the transient magnetizing current upon connecting the transformer to the line might cause false operation of the differential relay.

Referring now to Fig. 1, there is shown electric apparatus, such as a power transformer 10, which is subject to transient magnetizing currents. Transformer 10 is illustrated as having its primary winding 11 connected to a suitable source of power, not shown, through a circuit breaker 12, while its secondary winding 13 is connected to an associated electric circuit through circuit breaker 14. Circuit breakers 12 and 14 may comprise any suitable circuit-interrupting means which I have illustrated as circuit breakers of the latched closed type, each provided with trip coils 15.

For the protection against faults in the transformer 10, the circuit breakers 12 and 14 are arranged to be controlled in accordance with the difference between the current input and the current output of power transformer 10. For this purpose, there are provided current transformers 16 and 17, respectively having proper ratios of transformation and, having the primary windings thereof, connected in series relation with the primary and secondary windings 11 and 13 of power transformer 10. The secondary windings of the current transformers 16 and 17 are connected in a cumulative or circulating current circuit 18 across normally equipotential points of which there is connected electroresponsive means 19 whose operation is dependent upon the difference between the current input and the current output of power transformer 10 and is hereinafter referred to as differential relay 19.

Differential relay 19 may comprise any suitable relay operative upon a predetermined difference current flowing into and out of power transformer 10. I have illustrated differential relay 19 as arranged to close or bridge contacts 20 thereof when a predetermined difference exists between the current flowing into and the current flowing out of power transformer 10. Contacts 20 are connected in a circuit 21 for energizing tripping coils 15 of circuit breakers 12 and 14 and, consequently, the bridging or closing of contacts 20 causes tripping of circuit breakers 12 and 14.

The differential protective system described thus far is subject to false operation upon the occurrence of transient magnetizing currents when power transformer 10 is energized, particularly if the sensitivity of relay 19 is maintained at a desirable high value. In order to prevent such false operation of differential relay 19, I provide an electroresponsive device 22 which is operative only in response to the transient magnetizing currents which may flow in power transformer 10 to prevent relay 19 from causing tripping of circuit breakers 12 and 14 upon the occurrence of such transient magnetizing currents. Electroresponsive device 22 will be hereinafter referred to as blocking relay 22 since it blocks the effective operation of differential relay 19.

Blocking relay 22 is illustrated as a relay of the wattmetric type including windings 23 and 24, respectively. Winding 23 is illustrated as being energized by the circulating current flowing in differential circuit 18 and is connected in series with this circuit and the secondary windings of the current transformers 16 and 17. Winding 24, on the other hand, is energized from the output of full-wave rectifier 25 which in turn may be energized from any suitable means, such as from the circuit voltage across power transformer 10. However, since power transformer 10 is included in a high-voltage circuit, this would introduce additional insulating difficulties and, accordingly, as illustrated rectifier 25 may preferably be energized from differential circuit 18. I have illustrated a current transformer 26 of proper ratio so as to reduce sufficiently the current fed to full-wave rectifier 25 having a primary winding 27 connected in series with differential circuit 18 and a secondary winding 28 connected to rectifier 25. It will be understood by those skilled in the art that other means for energizing rectifier 25 from differential circuit 18 could be provided. For example, transformer 26 could be replaced by a resistance connected in series with differential circuit 18, the drop across which would be connected to rectifier 25.

It will be understood by those skilled in the art that a rectified unsmoothed alternating-current wave containing a fundamental component and odd harmonics is converted to a wave containing only even harmonics including particularly the second harmonic. In Fig. 2, I have illustrated a sine wave alternating-current fundamental (negative half cycle shown dotted) which is rectified to produce the current wave A shown solid in Fig. 2. It will be observed that this current wave A contains among other even harmonics a predominant second harmonic. If the alternating current were not a true sine wave but contained various harmonics, the rectified current wave would contain even harmonics only including the second. It is obvious, therefore, that winding 24 of blocking relay 22 is continually energized with a second harmonic of current in addition to other even harmonics and perhaps also a direct-current component. On the other hand, winding 23 of relay 22 is energized by the current flowing in the differential circuit 18 which contains the harmonics contained in the circuits with which current transformers 16 and 17 are associated. Since relay 22 is a wattmetric relay, only those components of current which flow in both windings 23 and 24 will cause a torque on the relay member indicated generally at 29.

As is well understood by those skilled in the art, the in-rush or transient magnetizing currents of electrical apparatus contains a second harmonic component and in Fig. 3, I have shown a typical wave of the transient magnetizing current which may flow in a power transformer. Upon inspection of this current wave it is obvious that it contains a predominant second harmonic.

Since electroresponsive device 22 is of the wattmetric type, operation thereof can only occur when winding 23 is also energized with a second harmonic current component or such components as are also contained in the current flowing in winding 24. Therefore, relay 22 will operate only when transformer 10 is connected to its source of energy and a transient magnetizing current flows in the primary winding thereof which might cause false operation of differential relay 19.

The operation of blocking relay 22 is arranged to prevent the effective operation of differential relay 19 and this may be accomplished in various ways. For example, the operation of relay 22 may cause interruption of the circuit which energizes the winding of differential relay 19. In Fig. 1, I have illustrated blocking relay 22 as arranged to control a normally closed solenoid-operated contactor 30, which is connected in trip circuit 21 of circuit breakers 12 and 14. Upon operation of blocking relay 22, the member 29 thereof closes either of two sets of parallelly arranged contacts 31 so as to energize solenoid-operated contactor 30 to open trip circuit 21 of circuit breakers 12 and 14 so that, even though differential relay 19 should close contacts 20 thereof in response to the differential current resulting because of such transient magnetizing current, nevertheless, false tripping of circuit breakers 12 and 14 is prevented. As will be obvious to one skilled in the art, the torque of a wattmetric type relay is reversed when either one but not both of the alternating-current quantities supplied thereto is reversed. By virtue of the rectifier 25, the second harmonic current in winding 24 will always have the initial pulse thereof in the same direction regardless of whether the first peak of the transient in-rush current is positive or negative. Consequently, since the initial current flowing in winding 23 of wattmetric relay 22 upon closing of circuit breakers 12 and 14 may be either positive or negative while the first pulse from rectifier 25 is always in a predetermined direction, the operating torque on member 29 may be in either direction, thus necessitating the two sets of contacts 31 to insure proper blocking operation.

It will be understood by those skilled in the art that member 29 of blocking relay 22 could be arranged to interrupt trip circuit 21 directly, whereupon solenoid operated contactor 30 would not be required. Such an arrangement is shown in Fig. 4 which is described hereinafter.

Although I have for convenience illustrated and described my invention as applied to a single-phase power transformer 10, it will be understood by those skilled in the art that it is esually adapted for the protection of polyphase transformers or other apparatus subject to transient in-rush currents. For the protection of three-phase electrical apparatus, three blocking relays, such as 22, could be used but, since the transient in-rush current always occurs in at least two phases, two such relays would give adequate protection. Protection of a three phase system might be obtained with a single blocking relay and means for automatically connecting it in the circuit of the phase or phases upon which the fault occurs.

The operation of the protective system shown in Fig. 1 will be obvious to those skilled in the art in view of the detailed description set forth above and, therefore, only a very brief discussion thereof will be included. Differential relay 19 is adjusted so as not to be affected by the difference in currents flowing into and out of transformer 10 due to the flow of the ordinary magnetizing current. Any difference above this predetermined amount will cause operation of differential relay 19 and tripping of the circuit breakers 12 and 14. If this difference is due to the large transient magnetizing current which flows when transformer 10 is connected to the line, the second harmonic component contained in this transient magnetizing current will flow through winding 23 of wattmetric blocking relay 22 and a torque will be produced on member 29 due to the interaction of the second harmonic flux produced by winding 23 and the second harmonic flux produced by winding 24 by virtue of the rectified alternating-current flowing through the latter. Operation of blocking relay 22 will, of course, prevent differential relay 19 from tripping circuit breakers 12 and 14, whereupon the sensitivity of the protective arrangement has not been impaired and yet false tripping is eliminated. Furthermore, this has been accomplished without the necessity of filter circuits or the like to obtain the desired harmonic currents.

Fault currents often contain direct-current components but these direct-current components usually decay much more rapidly than the direct-current components contained in the transient magnetizing currents and, furthermore, do not contain the predominant second harmonic that is present in the transient magnetizing currents. If desired, it is possible to eliminate completely the action of any direct-current component on blocking relay 22, for example, by using relay 22 for an induction dynamometer which, as is known to those skilled in the art, responds only to alternating current. Furthermore, suitable filters for eliminating this direct current component or an arrangement such as is disclosed and claimed in a copending application of Allen T. Sinks, Serial No. 339,121 filed June 6, 1940, and assigned to the assignee of the present application may be provided.

It may be desirable to prevent the current transformers 16 and 17 from being burdened by the windings associated with blocking relay 22 during fault-free operation and, accordingly, in Fig. 4, I have disclosed my invention as applied to the same system as in Fig. 1 with the corresponding parts thereof designated by the same reference numerals except that the windings 23 and 24 of blocking relay 22 are energized by being connected across the differential circuit rather than in series therewith as in Fig. 1. Accordingly, transformer 26 has its primary winding 27 connected in series with winding 23 of blocking relay 22 and these two windings are connected across differential circuit 18. It will be observed that the movable member 29 of blocking relay 22 directly controls contacts 32 connected directly in the tripping circuit 21 of circuit breakers 12 and 14.

As was mentioned above, rectifier 25 could be energized directly from the circuit voltage of transformer 10 in which case the windings 24 of all the blocking relays 22, if several were used as in the case of a polyphase system, might be energized from a single rectifier 25.

Although I have illustrated my invention as applied to a differential protective system, it will be understood by those skilled in the art that it is also applicable to other kinds of protection. For example, it might be used with ordinary over-current or distance protection where the danger of false operation due to transient in-rush phenomena exists.

While I have shown and described particular embodiments of my invention as applied to an electric protective arrangement, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States, is:

1. In a protective arrangement for electric apparatus subject to transient in-rush currents, a circuit interrupter for controlling the energization of said apparatus, means for controlling said interrupter including an electroresponsive device, and an independent relay operable only in response to a harmonic characteristic of such in transient in-rush currents for preventing the effective operation of said electroresponsive device.

2. In a protective arrangement for electric apparatus subject to transient in-rush currents, fault-responsive protective means energized in accordance with an electrical quantity depending upon the vector difference between the currents flowing into and out of said electric apparatus, and a relay responsive only to a second harmonic current flowing in said apparatus for preventing the effective operation of said fault-responsive protective means.

3. In combination with apparatus subject to transient in-rush currents, fault-responsive protective means comprising a first relay for isolating said apparatus upon the occurrence of a fault thereon, and means including a second independent relay operable only in response to a harmonic characteristic of such transient currents for preventing the effective operation of said first relay.

4. In combination with apparatus subject to transient magnetizing currents, fault-responsive protective means comprising a relay for isolating said apparatus upon the occurrence of a fault thereon, and means including a wattmetric relay operable only in response to a characteristic of such transient magnetizing currents for preventing the effective operation of said relay.

5. In a differential protective arrangement for a power transformer, a differential relay for causing the isolation of said power transformer upon the occurrence of a fault thereon, and a second relay operable only in response to the flow of the second harmonic component of transient magnetizing currents which currents might cause operation of said differential relay for preventing the isolation of said power transformer.

6. In combination with apparatus subject to transient magnetizing currents, fault-responsive protective means comprising a relay for isolating said apparatus upon the occurrence of a fault thereon, means for preventing the isolation of said apparatus in response to transient magnetizing currents comprising a second relay of the wattmetric type including a plurality of windings, means for energizing one of said windings from an alternating-current source, and means for energizing the other of said windings with rectified current from said source.

7. In a protective arrangement for electric apparatus subject to transient in-rush currents, fault-responsive protective means energized in accordance with an electrical quantity depending upon the vector difference between the currents flowing into and out of said electric apparatus for causing isolation of said apparatus upon the occurrence of a fault thereon, and means for rendering said fault-responsive protective means ineffective to isolate said apparatus upon the occurrence of transient in-rush currents which might otherwise cause false operation thereof comprising a relay of the wattmetric type including a plurality of windings, one of which constantly is energized with a second harmonic current while the other is energized in accordance with said electrical quantity.

8. In combination with a power transformer and a circuit interrupter for controlling the circuit thereof, means for controlling said interrupter including an electroresponsive device connected to be energized in accordance with the difference between the currents in the primary and the secondary windings of said transformer, and an independent relay operable in response to a predetermined harmonic of the transient magnetizing current of said transformer for rendering said electroresponsive device ineffective to cause operation of said circuit interrupter.

9. In a differential protective arrangement for an electrical system including a power transformer subject to transient magnetizing currents, a circuit interrupter for isolating said power transformer from the rest of said system upon the occurrence of a fault thereon, a tripping circuit for said circuit interrupter, a differential relay arranged to close said tripping circuit in response to abnormal electrical conditions on said power transformer, and a second relay for opening said tripping circuit to render said differential relay ineffective only upon the flow of a predetermined harmonic component of the transient magnetizing currents in said power transformer.

10. In combination with a power transformer and a circuit interrupter for controlling the circuit thereof, means for controlling said interrupter including an electroresponsive device connected to be energized in accordance with the difference between the currents in the primary and the secondary windings of said transformer, an independent wattmetric relay operable in response to a predetermined harmonic of the transient magnetizing current of said transformer for rendering said electroresponsive device ineffective to cause false operation of said circuit interrupter, said wattmetric relay comprising a pair of windings, means for energizing one of said windings with an alternating current proportional to the difference between the currents flowing in the primary and secondary windings of said transformer, and means for energizing the other of said windings with a current obtained by rectifying said alternating current.

HEINZ GUTMANN.